(12) United States Patent
Sundararajan et al.

(10) Patent No.: US 12,335,237 B2
(45) Date of Patent: Jun. 17, 2025

(54) SERVICE OPTIMIZATION IN NETWORKS AND CLOUD INTERCONNECTS

(71) Applicant: Cisco Technology, Inc., San Jose, CA (US)

(72) Inventors: Balaji Sundararajan, Fremont, CA (US); Venkatesh Nataraj, Union City, CA (US); Kannan Kumar, Tracy, CA (US); Padmanabha Nallur, Fremont, CA (US); Abha Jain, Menlo Park, CA (US); Kushal Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 18/072,374

(22) Filed: Nov. 30, 2022

(65) Prior Publication Data
US 2024/0179125 A1      May 30, 2024

(51) Int. Cl.
H04L 9/40 (2022.01)

(52) U.S. Cl.
CPC ...... *H04L 63/0263* (2013.01); *H04L 63/0428* (2013.01)

(58) Field of Classification Search
None
See application file for complete search history.

(56) References Cited

U.S. PATENT DOCUMENTS

| | | |
|---|---|---|
| 11,140,200 B1 | 10/2021 | A |
| 11,388,140 B1 | 7/2022 | Singh et al. |
| 2003/0065944 A1* | 4/2003 | Mao ............. H04L 63/04 709/229 |
| 2008/0134332 A1 | 6/2008 | Keohane |
| 2010/0158009 A1 | 6/2010 | Lee et al. |
| 2011/0099631 A1 | 4/2011 | Willebeek-Lemair et al. |
| 2019/0215306 A1 | 7/2019 | Gopal et al. |
| 2020/0177606 A1* | 6/2020 | Valluri ............ H04L 63/0272 |
| 2021/0266291 A1* | 8/2021 | Sundararajan ...... H04L 63/0272 |

FOREIGN PATENT DOCUMENTS

| | | | | |
|---|---|---|---|---|
| EP | 3993331 A1 | 5/2023 | | |
| WO | WO-2010031084 A1 | * | 3/2010 | ............. H04L 47/10 |
| WO | WO-2021147372 A1 | * | 7/2021 | ............. H04L 45/74 |

OTHER PUBLICATIONS

"Kevin et al. Equinix and Cisco Optimize Software-Defined Cloud Inter connection" Published on Mar. 31, 2021 (Year: 2021).*
The PCT Search Report and Written Opinion mailed Feb. 29, 2024 for PCT Application No. PCT/US2023/081864 from PCT Summary, 30 pages.

* cited by examiner

*Primary Examiner* — Younes Naji
(74) *Attorney, Agent, or Firm* — Lee & Hayes, P.C.

(57) ABSTRACT

This disclosure describes techniques and mechanisms for disclosure describes techniques and mechanisms for optimizing firewall enforcement. The techniques may implement a dynamic detection of Layer 7 processing at one end of the network, alleviating the need to enforce another layer 7 firewall inspection at the other end, thereby saving processing and network resources. The techniques enable firewalls and policies to be statically defined and located in one place.

18 Claims, 5 Drawing Sheets

SERVICE OPTIMIZATION IN NETWORKS AND CLOUD INTERCONNECTS

TECHNICAL FIELD

The present disclosure relates generally to the field of computer networking, and more particularly to optimizing service in software defined cloud interconnects (SDCI) SDWAN networks.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is a software defined cloud interconnects (SDCI) software defined wide area network (SD-WAN). In SDCI SDWAN networks customers may deploy an edge device and a core device (e.g., such as a network device) to send traffic from a branch and/or edge of the network to a cloud server and/or data center server(s). Generally, customers enable security inspections at the edge device and the core device. This means, in SDCI networks, there are firewall inspections that occur, where the firewall inspections intercept and inspect traffic on SDWAN headend device(s)(e.g., other network devices). For example, when a customer deploys a SDWAN router with an identical URL filtering policy at a branch site and at a headend device. In this example, the headend device and/or branch site devices may be SDCI Devices. Accordingly, when traffic was sent from branch to cloud via SDCI routers the data packets are subjected to Layer 7 firewall inspection at both ends. However, this is redundant, inefficient and uses a great deal of CPU and processing resources available to the routers and the network.

Accordingly, there is a need for a simplified way to prevent multiple layer 7 processing of firewall rules within a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
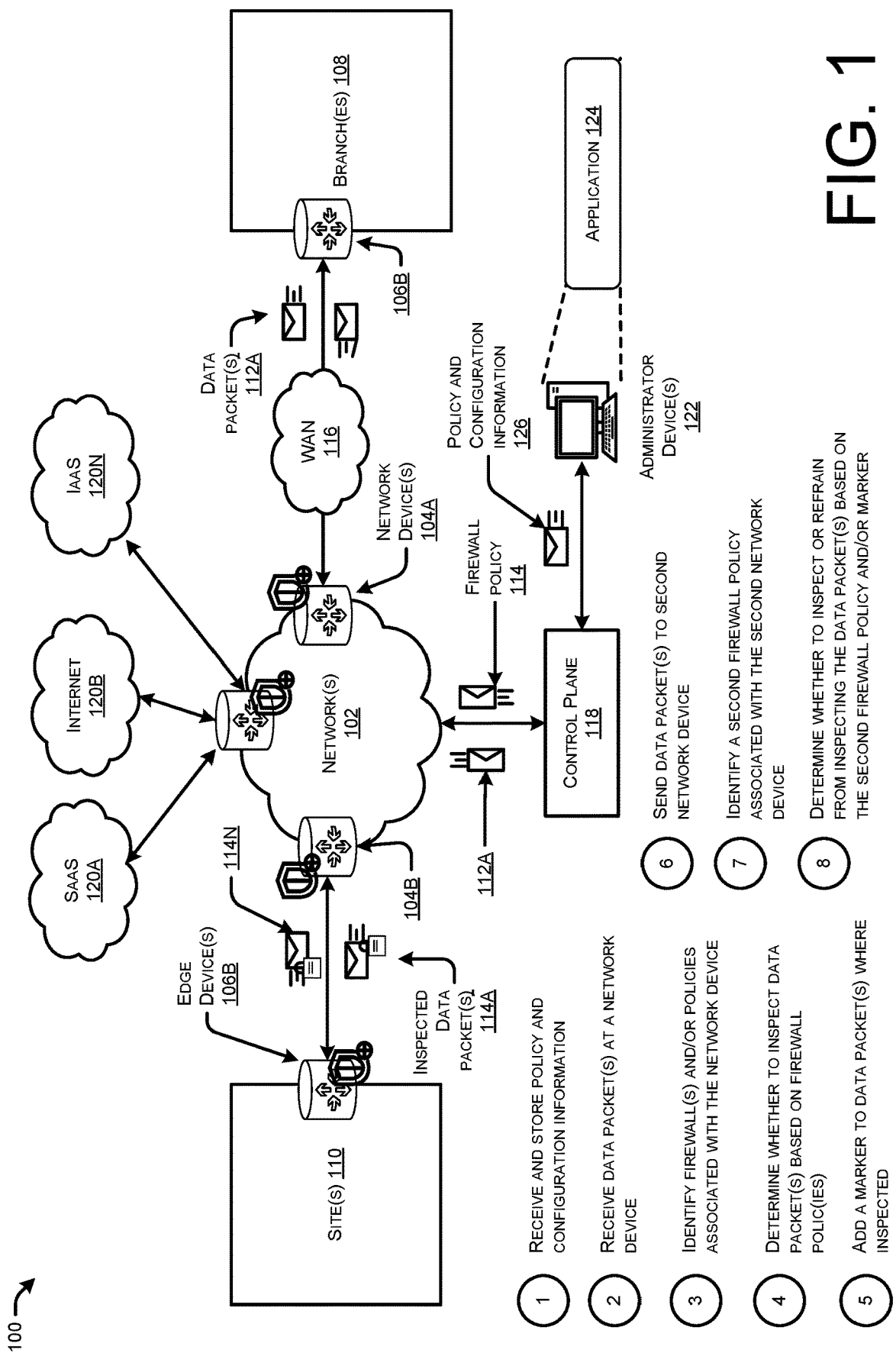
FIG. 1 illustrates a system-architecture diagram of an environment in which a system can optimize service in a software defined cloud interconnects (SDCI) SDWAN networks.

The present disclosure relates generally to the field of computer networking, and more particularly to optimizing service in software defined cloud interconnects (SDCI) SDWAN networks.

A method to perform the techniques described herein may include receiving, by a first network device located at a first site, a data packet, wherein the data packet corresponds to a data flow between the first network device and a second network device over a network. Additionally, the method may include identifying a first firewall policy associated with the first network device. The method may also include inspecting, based at least in part on the first firewall policy and by a first firewall, the data packet by the first network device. Further, the method may include adding, by the first network device, a marker to the data packet to indicate inspection by the first firewall. The method may include transmitting, via the network, the data packet to the second network device at a second site. The method may further include identifying a second firewall policy associated with a second network device. Additionally, the method may include determining, by the second network device, based at least in part on the second firewall policy and the marker, to refrain from inspecting the data packet.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is a software defined cloud interconnects (SDCI) software defined wide area network (SD-WAN). In SDCI SDWAN networks customers may deploy an edge device and a core device (e.g., such as a network device) to send traffic from a branch and/or edge of the network to a cloud server and/or data center server(s). Generally, customers enable security inspections at the edge device and the core device. This means, in SDCI networks, there are firewall inspections that occur, where the firewall inspections intercept and inspect traffic on SDWAN headend device(s) (e.g., other network devices). For example, when a customer deploys a SDWAN router with an identical URL filtering policy at a branch site and at a headend device. In this example, the headend device and/or branch site devices may be SDCI Devices. Accordingly, when traffic was sent from branch to cloud via SDCI routers the data packets are subjected to Layer 7 firewall inspection at both ends. However, this is redundant, inefficient and uses a great deal of CPU and processing resources available to the routers and the network.

Accordingly, there is a need for a simplified way to prevent multiple layer 7 processing of firewall rules within a network.

This disclosure describes techniques and mechanisms for a control plane to prevent multiple layer 7 firewall processing from occurring within a SDCI SDWAN network. In some examples, the system may receive, by a first network device located at a first site, a data packet, wherein the data packet corresponds to a data flow between the first network device and a second network device over a network. The system may identify a first firewall policy associated with the first network device. The system may inspect, based at least in part on the first firewall policy and by a first firewall, the data packet by the first network device. The system may add, by the first network device, a marker to the data packet to indicate inspection by the first firewall. The system may transmit, via the network, the data packet to the second network device at a second site. The system may identify a second firewall policy associated with the second network device. The system may determine, by the second network device, based at least in part on the second firewall policy and the marker, to refrain from inspecting the data packet.

In some examples, the system may enable firewall inspections to occur at a branch site and/or branch device. The system may define the Layer 7 URL Filtering Policy to inspect. In some examples, a data packet may carry information in a CMD header, where the information indicates to a SDCI router, not to process Layer 7 Firewall inspection on its remote end (SDCI Headend).

In some examples, the data packet may comprise unified threat defense (UTD) metadata. In some examples, the UTD metadata is added only to the first packet of a packet flow, including any retransmissions. The information in the UTD metadata may be cached in a UTD session data on the remote router, so it is not needed in every packet of the flow. This ensures we do not add unnecessary overhead to each packet. In some examples, the UTD metadata information exchange between the routers is uni-directional, such that UTD metadata will be sent from the first ingress router and/or initiator branch to the next egress router and/or remote branch. In this example, no response is expected from the remote branch. In some examples, UTD metadata may be added to the SDWAN header in a TLV format. For instance, the UTD metadata may be added in a TLV format to both IPSec encapsulated packets and/or GRE encapsulated packets.

In some examples, the system may comprise a data plane module that is configured to handle data packets and data packet flow. In some examples, the system may utilize a unified security policy (USP). In some examples, the data plane module may be configured to have a zone-based firewall (ZBFW) first action (FIA) and send all packets of a packet flow to a universal threat defense (UTD) FIA of the control plane. In some examples, sending may comprise a call, such as "utd_first_invoke_policy_lookup( )". In some examples, the UTD FIA may receive on the basis of UTD metadata in the "pkt_state", will decide to skip inspection and return "UTD_SKIP_INSPECT" back to the data plane module and/or ZBFW FIA. In some examples, the data plane module and/or the ZBFW may then forward the data packet to a destination device. In some examples, the UTD FIA may create a cross file transfer (CFT) flow, even when it decides to skip inspection for any reason for statistics purpose. In some examples, regardless of UTD metadata sharing, the data plane module and/or ZBFW may classify the packet flow on both the ingress and egress routers. Once classified the data plane module and/or ZBFW may receive the UTD inspection profile to apply to the data flow. In some examples, the data plane module and/or ZBFW may send the profile information to UTD FIA. In some examples, the UTD FIA may determine that there is no profile id extracted from the packet state the ingress router. In this example, the ingress router may perform a firewall inspection and send an instruction to the control plane to add the UTD metadata to SDWAN header. In some examples, the UTD FIA on the egress router may compare the profile id to the profile id extracted from the data packet state (e.g., metadata shared by ingress router). If the profile ids match, the UTD FIA may refrain from inspecting the data packet and inform ZBFW accordingly. If the profile ids do not match, the UTD FIA may apply the current profile to the packet flow.

In some examples, the system may comprise a policy configuration module. In some examples, the policy configuration module enables users to pre-configure firewall(s) and/or firewall policies associated with device(s) within the network. In some examples, the firewall(s) and/or firewall policies are stored as part of the control plane, in a single location.

In this way, the system may save enormous amounts of compute power by not having to process layer 7 firewall inspections at the SDCI end, as branch site(s) and/or device(s) are capable of enforcing the firewalls. Accordingly, the techniques may optimize the firewall enforcement and may implement a dynamic detection of Layer 7 processing at one end of the network, alleviating the need to enforce another layer 7 firewall inspection at the other end, thereby saving processing and network resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can optimize service in a software defined cloud interconnects (SDCI) SDWAN networks. While the system 100 shows an example control plane 118, it is understood that any of the components of the system may be implemented on any device in the network 102.

In some examples, the system 100 may include a network 102 that includes network devices 104. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a control plane 118. In some examples, the control plane 118 corresponds to a system that has complete visibility into the security fabric of a given network (e.g., enterprise network, smaller network, etc. In some examples, the control plane 118 may comprise a controller, one or more processors, etc. In some examples, the control plane 118 may be integrated as part of Cisco's vSmart feature, Cisco's vManage feature, and/or included in a SD-WAN architecture.

The control plane 118 may be configured to communicate with one or more network device(s) 104. For instance, as noted above the control plane 118 may receive network data (e.g., network traffic load data, network client data, etc.) or other data (e.g., application load data, data associated with WLCs, APs, etc.) from the network device(s) 104. The network device(s) 104 may comprise routers, switches, access points, stations, radios, or any other network device. In some examples, the network device(s) 104 may monitor traffic flow(s) within the network and may report information associated with the traffic flow(s) to the control plane 118.

In some examples, the system comprises branch(es) 108 and/or site(s) 110. In some examples, the branch(es) 108 comprise one or more user(s), mobile device(s), and/or Internet of Things (IOT) device(s) located at one or more locations. In some examples, the branch(es) 108 communicate via edge device(s) 106. In some examples, the edge device(s) 106 comprise one or more routers, access point(s), or any other network device. In some examples, the edge device(s) 106 may comprise an ingress and/or egress router. In some examples, the network device(s) 104 may comprise a SDCI router and/or headend device. In some examples, the branch(es) 108 and/or site(s) 110 communicate with each other, the control plane 118, or cloud providers 120 (e.g., SaaS 120A, Internet 120B, IaaS 120N, etc.) via the network(s) 102 and/or a WAN 116. In some examples, the WAN 116 comprises an SDWAN.

In some examples, the edge device(s) 106 and/or network device(s) 104 may communicate information. For instance, the network device(s) 104 may send data packet(s) 112 associated with data flows to other network device(s) and/or edge device(s) 106. In some examples, the data packet(s) 112 and/or metadata associated with the data packet(s) 112 may be sent to and/or monitored by the control plane 118, such as by a data plane module.

In some examples, the control plane 118 may be configured to monitor the packets 112. In some examples, the packets may comprise data (e.g., which application is used, by which station, traffic characteristics and duration, etc.) associated with network traffic and may store the data as part of the system and/or control plane 118 (e.g., such as in a database and/or memory associated with the control plane 118).

In some examples, administrator device(s) 122 may send policy and/or configuration information 126 to the control plane 118. The policy and/or configuration information 126 may include policy information associated with firewall(s), network device(s) configured to implement the firewall(s) and/or firewall policies, etc. In some examples, the control plane 118 may receive information associated with a data packet and/or data flow. In response, the control plane 118 may identify one or more firewall policies associated with the data packet, network device 104, and/or edge device 106. In some examples, the control plane 118 may send information 114 indicating whether to implement a firewall and/or firewall policy for a data packet 112 to one or more of the network device(s) 104 and/or edge device(s) 106 at the site(s) and/or branch(es) 108. Where the data packet 112 is inspected by the network device(s) 104 and/or edge device(s) 106, the network device 104 and/or edge device 106 may send the inspected data packet 114 to another network device 104 and/or edge device 106. For instance, the inspected data packet 114 may comprise UTD metadata. The UTD metadata may include a flag indicating that the data packet has been processed and/or processed by a layer 7 firewall policy.

In some examples, the control plane 118 may be configured to communicate with administrator device(s) 122. As illustrated, the administrator device(s) 122 may comprise an application 124. In some examples, the application 124 may correspond to an application provided by a service provider (e.g., such as Cisco) that enables an administrator of the network 102 to access the control plane 118. For instance, the application 124 may correspond to Cisco's vSmart feature and/or Cisco's vManage feature.

At "1", the system may receive and store policy and configuration information. For instance, the system may receive firewall policy information and/or firewall configuration information associated with one or more network device(s) and/or edge device(s). The system may store the policy and configuration information in memory or a database associated with the system.

At "2", the system may receive data packet(s) at a network device. In some examples, the system may receive data packet(s) at the edge device(s). The data packet(s) may be associated with data flows. In some examples, the data packet(s) may be received from the site(s) 110 and/or branch(es) 108.

At "3", the system may identify firewall(s) and/or policies associated with the network device. In some examples, the system may identify one or more pre-configured firewall policies associated with the network device. In some examples, the system may identify a pre-configured firewall policy associated with an edge device.

At "4", the system may determine whether to inspect the data packet(s) based on the firewall policies. For instance, where the data packet has not been inspected and the network device is configured to support a layer 7 firewall inspection, the system may determine to process the data packet.

At "5", the system may add a marker to the data packet(s) that were inspected. In some examples, the marker comprises adding UTD metadata to a SDWAN header of the data packet in a TLV format. In some examples, the data packet comprises a header and the data and/or metadata included in the header is encrypted. In some examples, the marker comprises a flag included in UTD metadata in a header of the data packet, wherein the flag is included as part of a security level TLV.

At "6", the system may send the data packet(s) to a second network device. In some examples, the second network device may comprise a SDCI headend device. In some examples, the second network device may decapsulate the packet to identify the UTD metadata.

At "7", the system may identify a second firewall policy associated with the second network device. In some examples, the second firewall policy may indicate whether to implement layer 7 firewall processing on the data packet. In some examples, the system may identify a firewall policy that is pre-configured by a user (e.g., network administrator) and stored by the control plane 118.

At "8", the system may determine whether to inspect or refrain from inspecting the data packet(s) based at least in part on the second firewall policy and/or marker. For instance, where the marker indicates that the data packet has already been In this way, the system may save enormous amounts of compute power by not having to process layer 7 firewall inspections at the SDCI end, as branch site(s) and/or device(s) are capable of enforcing the firewalls. Accordingly, the techniques may optimize the firewall enforcement and may implement a dynamic detection of Layer 7 processing at one end of the network, alleviating the need to enforce another layer 7 firewall inspection at the other end, thereby saving processing and network resources.

Figure 2:
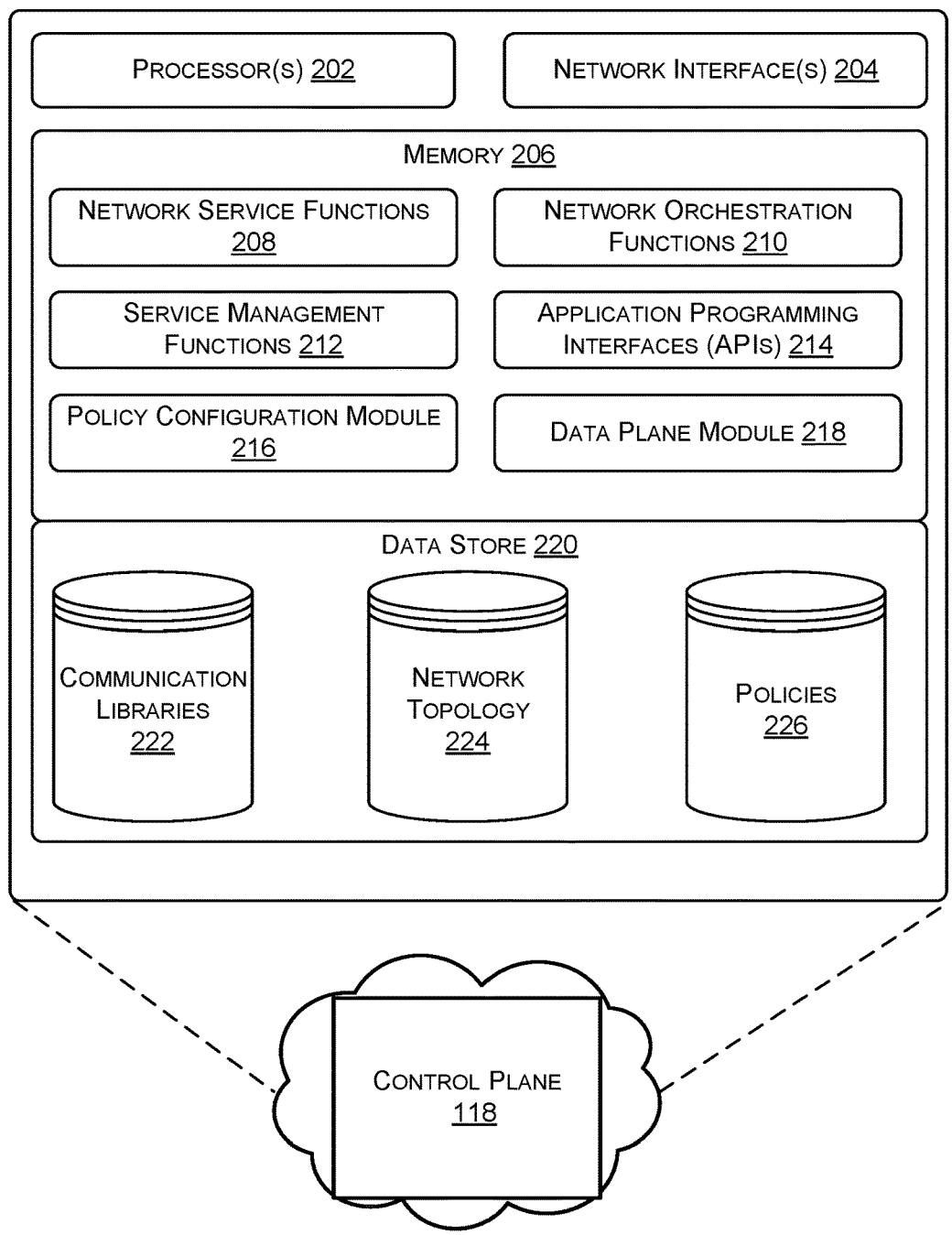
FIG. 2 illustrates a component diagram of an example control plane described in FIG. 1.

FIG. 2 illustrates a component diagram of an example monitoring system described in FIG. 1. In some instances, the control plane 118 may run on one or more computing devices in, or associated with, the network 102 (e.g., a single device or a system of devices). In some instances, the control plane 118 may be integrated as part of a cloud-based management solution (e.g., such as Cisco's vSmart feature and/or Cisco's vManage feature).

Generally, the control plane 118 may include a programmable controller that manages some or all of the control plane activities of the network 102, and manages or monitors the network state using one or more centralized control models.

As illustrated, the control plane 118 may include, or run on, one or more hardware processors 202 (processors), one or more devices, configured to execute one or more stored instructions. The processor(s) 202 may comprise one or more cores. Further, the control plane 118 may include or be associated with (e.g., communicatively coupled to) one or more network interfaces 204 configured to provide communications with network device(s) 104, the edge device(s) 106 and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDCI's, and so forth. For example, the network interfaces 204 may include devices compatible with any networking protocol.

The control plane 118 may also include memory 206, such as computer-readable media, that stores various executable components (e.g., software-based components, firmware-based components, etc.). The memory 206 may generally store components to implement functionality described herein as being performed by the control plane 118. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the control plane 118.

The control plane 118 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various control plane functions to occur.

Further, the control plane 118 may include a policy configuration module 216. In some examples, the policy configuration module enables users to pre-configure firewall (s) and/or firewall policies associated with device(s) within the network. In some examples, the firewall(s) and/or firewall policies are stored as part of the control plane, in a single location.

The control plane 118 may include a data plane module 218. In some examples, the data plane module 218 is configured to handle data packets and data packet flow. In some examples, the system may utilize a unified security policy (USP). In some examples, the data plane module may be configured to have a zone-based firewall (ZBFW) first action (FIA) and send all packets of a packet flow to a universal threat defense (UTD) FIA of the control plane. In some examples, sending may comprise a call, such as "utd_first_invoke_policy_lookup( )". In some examples, the UTD FIA may receive on the basis of UTD metadata in the "pkt_state", will decide to skip inspection and return "UTD_SKIP_INSPECT" back to the data plane module and/or ZBFW FIA. In some examples, the data plane module 218 and/or the ZBFW may then forward the data packet to a destination device. In some examples, the UTD FIA may create a cross file transfer (CFT) flow, even when it decides to skip inspection for any reason for statistics purpose. In some examples, regardless of UTD metadata sharing, the data plane module and/or ZBFW may classify the packet flow on both the ingress and egress routers. Once classified the data plane module 218 and/or ZBFW may receive the UTD inspection profile to apply to the data flow. In some examples, the data plane module and/or ZBFW may send the profile information to UTD FIA. In some examples, the UTD FIA may determine that there is no profile id extracted from the packet state the ingress router. In this example, the ingress router may perform a firewall inspection and send an instruction to the control plane to add the UTD metadata to SDWAN header. In some examples, the UTD FIA on the egress router may compare the profile id to the profile id extracted from the data packet state (e.g., metadata shared by ingress router). If the profile ids match, the UTD FIA may refrain from inspecting the data packet and inform ZBFW accordingly. If the profile ids do not match, the UTD FIA may apply the current profile to the packet flow.

In some examples, the UTD proxy configuration is enabled under Unified Security Policy, TTM is updated with UTD proxy capability of all the local TLOCs, which in turn triggers a TLOC update to the control plane 118 through OMP. The control plane 118 may distribute the modified TLOC properties to all the other TLOCs in the network. In some examples, such as when a network device and/or edge device receives a remote TLOC update from the control plane 118, the network device and/or edge device may update the SDWAN data plane (e.g., such as the data plane module 218 with the new capability information, so that the data plane module 218 can make the correct decision on whether or not to impose the UTD metadata header onto the packets. In some examples, the UTD metadata header will be imposed only if both an ingress router (e.g., such as an edge device) and the remote router/TLOC (e.g., such as a network device) have the feature enabled.

The control plane 118 may further include a data store 220, such as long-term storage, that stores communication libraries 222 for the different communication protocols that the control plane 118 is configured to use or perform. Additionally, the data store 220 may include network topology data 224, such as a model representing the layout of the network components in the network 102 and/or data indicating available bandwidth, available CPU, delay between nodes, computing capacity, processor architecture, processor type(s), etc. The data store 220 may store policies 222 that includes security data associated with the network, security policies configured for the network, firewall policies, firewall configuration data, and/or compliance policies configured for the network.

Figure 3:
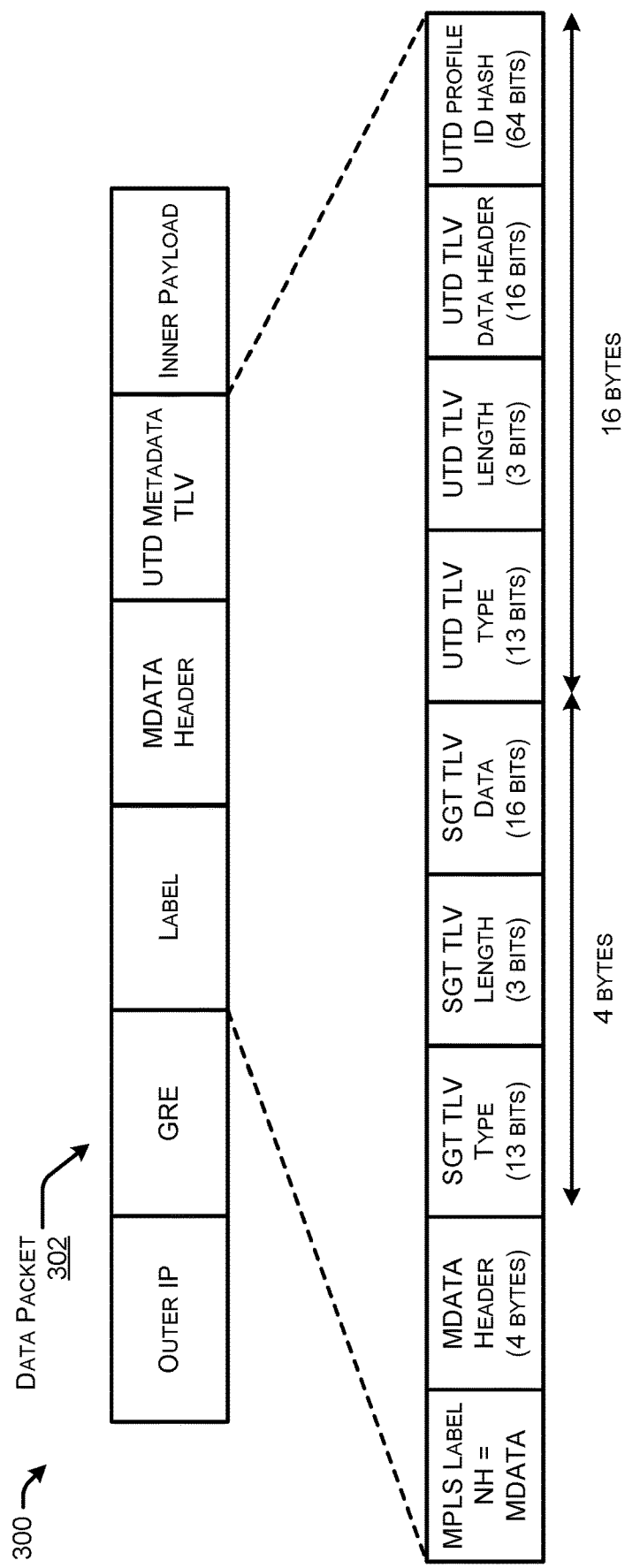
FIG. 3 illustrates an example environment including a data packet that is generated by the system described in FIGS. 1-2.

FIG. 3 illustrates an example environment including a data packet that is generated by the system described in FIGS. 1-2. In some examples, the data packet 302 may be generated by an ingress router (e.g., such as an edge device 106 or another network device located at the branch(es) 108 and/or site(s) 110. The data packet 302 may correspond to a SDWAN GRE packet format that comprises two metadata TLVs (e.g., SGT and UTD). While the exemplary data packet 302 comprises two metadata TLVs, it is understood that any number of metadata TLVs may be included as part of the data packet 302.

As illustrated, the data packet 302 may include an outer IP, a GRE, a label, a metadata header, a SGT TLV. a UTD TLV, and an inner payload. As illustrated, the label, metadata header, and UTD metadata TLV may comprise an MPLS label (e.g., NH=Metadata) and a metadata header that is 4 bytes in length. The SGT TLV metadata may be 4 bytes in length and may comprise an SGT TLV type that is 13 bits, an SGT TLV length that is 3 bits, and SGT TLV data that is 16 bit. The UTD TLV metadata may comprise 16 bytes and may include a UTD TLV type (13 bits), a UTD TLV length (3 bits), a UTD TLV data header (16 bits) and a UTD profile ID hash (64 bits).

In some examples, the UTD profile ID is used to identify the policy associated with a network device and/or an edge device. For instance, after performing UTD inspection (e.g., UTD processing of a layer 7 firewall), an ingress (e.g., initiator) router, such as an edge device 106 and/or network device 104, can send information about the UTD profile ID applied to the data flow as metadata included in the data packet 302. The data packet may be sent to another network device in the network. The next routers and/or network device(s) and/or edge device(s) in the packet path (all the way to the last egress (e.g., responder) router, may extract the UTD profile ID and other metadata information from the headers of the data packet. The UTD profile ID may be sent as part of a call to the control plane and in response, the control plane may instruct the subsequent network device(s) and/or edge device(s) to skip UTD inspection (e.g., layer 7 firewall processing), thereby saving CPU cycles and other resources on the routers.

In some examples, the metadata included in the data packet 302 is encrypted. In some examples, the encryption may be performed using an encryption protocol (e.g., SSL, TSL, DTSL, etc.). In some examples, the UTD metadata may be added only to the first packet of a packet flow, including any retransmissions. The UTD metadata may be cached in the UTD session data on a remote router (e.g., edge device(s) 106 and/or network device(s) 104), so it is not needed in every packet of the flow.

In some examples, the UTD metadata information exchange between network device(s) and/or edge device(s) is uni-directional, such that metadata will be sent from the first/ingress (e.g., initiator) branch to the next/egress (e.g., remote) branch. In some examples, no response is expected from the remote branch. In some examples, a UTD proxy capability bit is sent to the control plane 118 via OMP along with other TLOC properties. The control plane 118 may distribute the UTD proxy capability information to all other edge devices.

Figure 4:
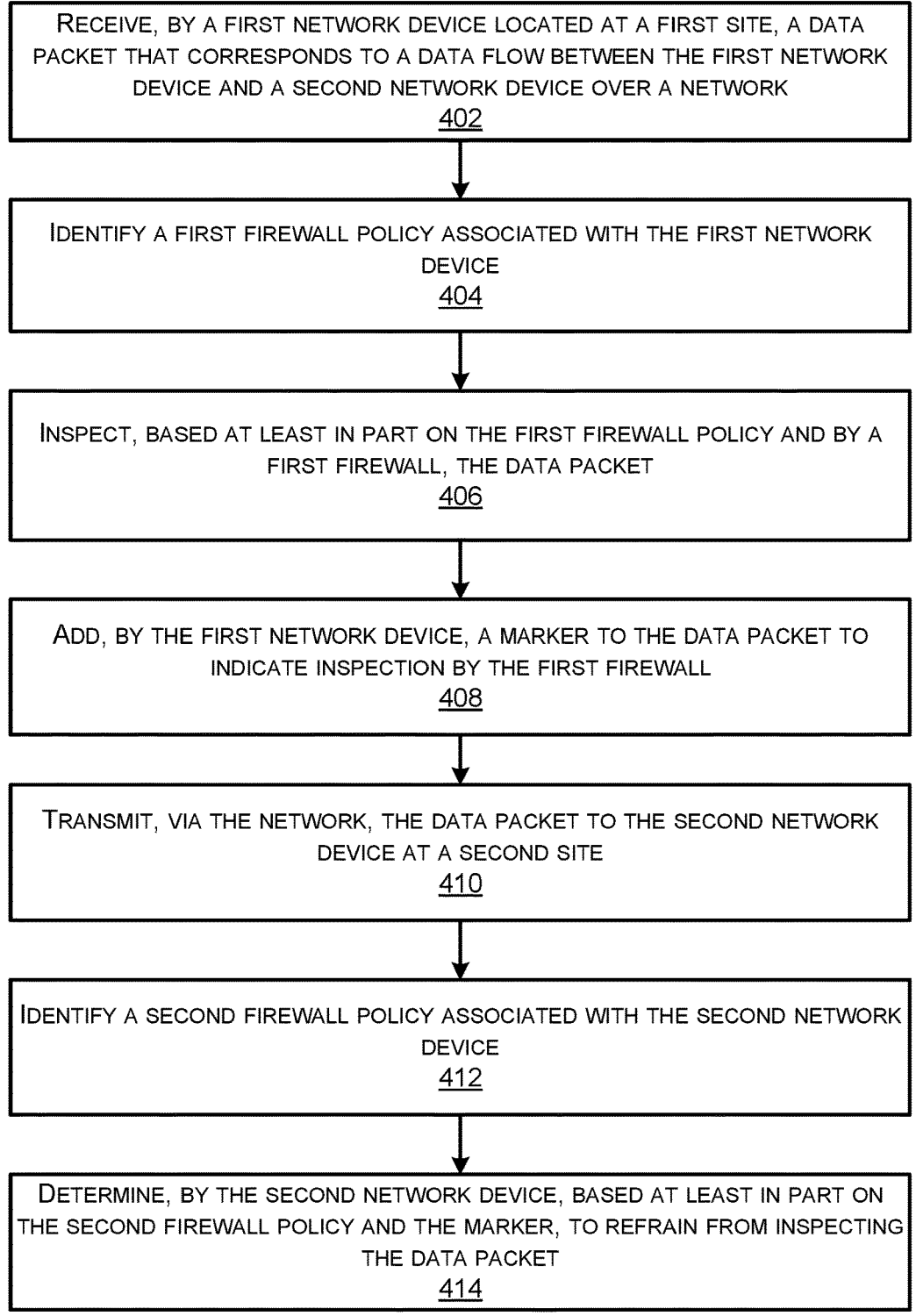
FIG. 4 illustrates a flow diagram of an example method for optimizing services in a network associated with the system described in FIGS. 1-3.

In some examples,

FIG. 4 illustrates a flow diagram of an example system 400 for optimizing services in a network. In some instances, the steps of system 400 may be performed by one or more devices (e.g., control plane 118, network device(s) 104, etc.) that include one or more processors and one or more non-transitory computer-readable media storing computer-executable instructions that, when executed by the one or more processors, cause the one or more processors to perform operations of system 400.

At 402, the system may receive, by a first network device located at a first site, a data packet, wherein the data packet corresponds to a data flow between the first network device and a second network device over a network. In some examples, the network comprises a SDCI WAN. In some examples, the data packet comprises UTD metadata. In some examples, the data packet comprises a header, wherein data included in the header of the data packet is encrypted.

At 404, the system may identify a first firewall policy associated with the first network device. For instance, the system may identifier a firewall policy associated with a policy ID of the first network device.

At 406, the system may inspect, based at least in part on the first firewall policy and by a first firewall, the data packet by the first network device. For instance, the system may process the data packet according to a layer 7 firewall policy. In some examples, the data packet is subjected to firewall inspection based on firewall policy. In some examples, the data packet is redirected to the local firewall in the branch and/or site (a.k.a great wall).

At 408, the system may add, by the first network device, a marker to the data packet to indicate inspection by the first firewall. In some examples, adding the marker comprises adding and/or inserting UTD metadata to a SDWAN header of the data packet in a TLV format. In some examples, the marker comprises a flag included in UTD metadata in a header of the data packet, wherein the flag is included as part of a security level TLV.

In some examples, after inspection by the firewall, the system may add an attribute to the specific type of TLV attribute (e.g., Malware Detection, Threat Detection, URL Filtering) etc. to the type of services inspected. This attribute may be added inside the IPSEC header of the data packet in order to keep the information secure.

At 410, the system may transmit, via the network, the data packet to the second network device at a second site. In some examples, the first network device comprises a SDCI router and the second network device comprises a SDCI headend device. In some examples, the data packet is sent to an egress interface, where the IPSEC header is added. The data packet may then be sent over the tunnel to the second network device.

In some examples, the data packet is decapsulated at the second network device. In some examples, the second network device examines the firewall flag included inside the header (e.g., as indicated by the security level TLV) of the data packet.

At 412, the system may identify a second firewall policy associated with a second network device. In some examples, a policy ID associated with the first network device comprises a same policy ID as the second network device.

At 414, the system may determine, by the second network device, based at least in part on the second firewall policy and the marker, to refrain from inspecting the data packet. In some examples, refraining from inspecting the data packet comprises refraining from processing a Layer 7 Firewall inspection by the second network device. In some examples, the second network device makes a decision to process the flow further at its local firewall (aka Great wall) at a site and/or branch of the network. For instance, in some examples, the data packet may not meet the security level required at the site and/or edge. In this example, the data packet may be redirected to an external FTD firewall, thereby avoiding processing on the local firewall by policy. In some examples, if the security threat level was met by the data packet and the site security level happens to be same, then firewall redirection will be skipped.

Figure 5:
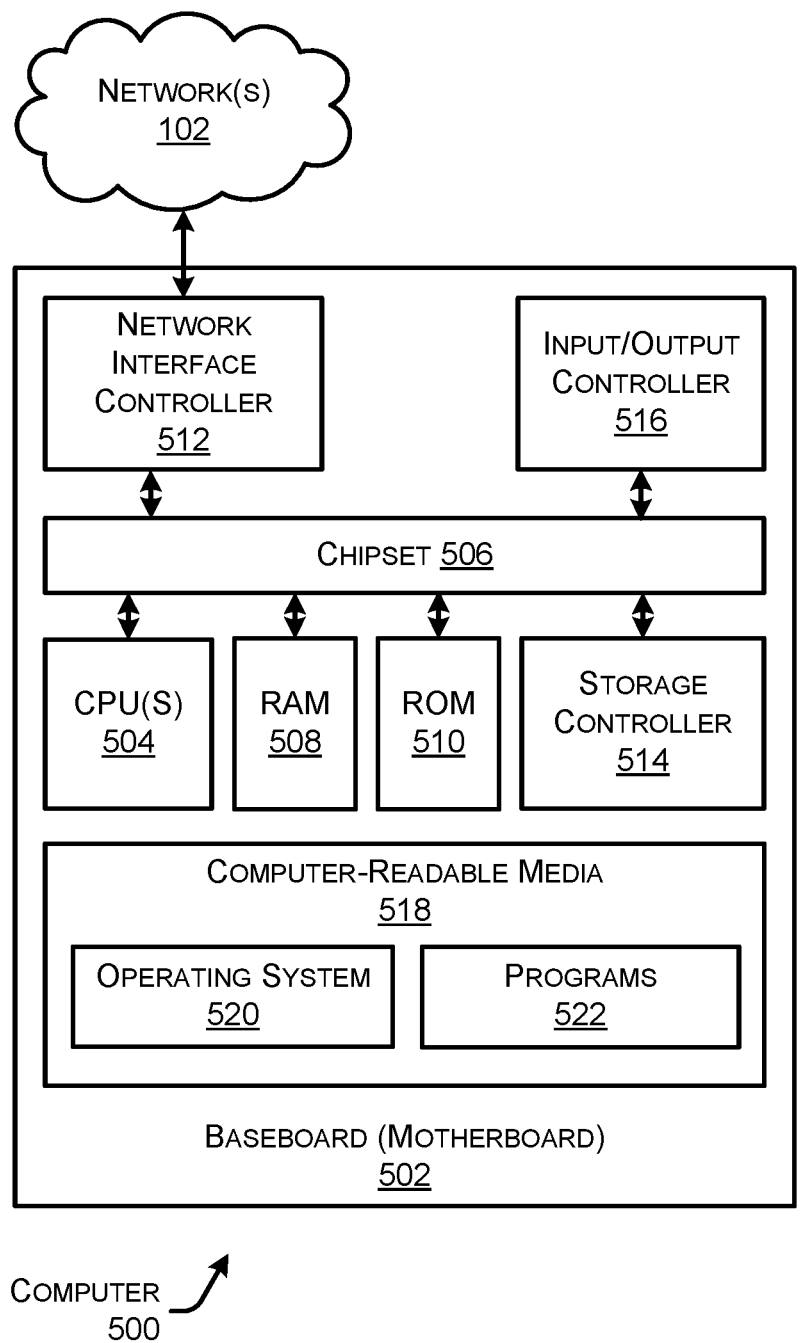
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a control plane 118 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the control plane 118 and/or any components included therein, may be supported by one or more devices similar to computer 500. Stated otherwise, some or all of the operations performed by the control plane 118 and/or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a control plane 118 and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the control plane 118 and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques including receiving, by a first network device located at a first site, a data packet, wherein the data packet corresponds to a data flow between the first network device and a second network device over a network; identifying, by the first network device, a first firewall policy; inspecting, based at least in part on the first firewall policy and by a first firewall, the data packet by the first network device; adding, by the first network device, a marker to the data packet to indicate inspection by the first firewall; transmitting, via the network, the data packet to the second network device at a second site; identifying, by the second network device, a second firewall policy; and determining, by the second network device, based at least in part on the second firewall policy and the marker, to refrain from inspecting the data packet.

In this way, the computer 500 can save enormous amounts of compute power by not having to process layer 7 firewall inspections at the SDCI end, as branch site(s) and/or device(s) are capable of enforcing the firewalls. Accordingly, the techniques may optimize the firewall enforcement and may implement a dynamic detection of Layer 7 processing at one end of the network, alleviating the need to enforce another layer 7 firewall inspection at the other end, thereby saving processing and network resources.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, by a first network device located at a first site, a data packet, wherein the data packet corresponds to a data flow between the first network device and a second network device over a network;
identifying a first firewall policy associated with the first network device, the first firewall policy being provided by a controller and identifying a first firewall of the network configured to inspect the data packet;
inspecting, based at least in part on the first firewall policy and by the first firewall of the network, the data packet by the first network device;
adding, by the first network device, a marker to a header of the data packet to indicate inspection by the first firewall, the marker comprising unified threat defense (UTD) metadata;
transmitting, via the network, the data packet to the second network device at a second site;
identifying, based on receiving the data packet and by the second network device, a second firewall policy associated with the second network device, wherein the UTD metadata indicates a profile identifier applied to the data packet by the first firewall, wherein identifying the second firewall policy is based on extracting the profile identifier; and
determining, by the second network device, based at least in part on the second firewall policy and extracting the marker from the header, to refrain from inspecting the data packet.

2. The method of claim 1, wherein the data packet further comprises an initial data packet of the data flow, the method further comprising refraining from adding the marker to subsequent data packets of the data flow.

3. The method of claim 1, wherein refraining from inspecting the data packet comprises refraining from processing a Layer 7 Firewall inspection by the second network device.

4. The method of claim 1, wherein the first network device comprises a software defined cloud interconnect (SDCI) router and the second network device comprises a SDCI headend device.

5. The method of claim 1, wherein the UTD metadata is added to a software-defined wide area network header of the data packet in a tag length value format.

6. The method of claim 1, wherein the marker comprises a flag included in the UTD metadata, wherein the flag is included as part of a security level tag length value.

7. The method of claim 1, wherein the network comprises a software defined cloud interconnect wide area network and wherein the data packet comprises a header, wherein data included in the header of the data packet is encrypted.

8. A system comprising:
one or more processors; and
one or more non-transitory computer-readable media storing computer-executable instructions that, when executed by the one or more processors, cause the one or more processors to perform operations comprising:
receiving, by a first network device located at a first site, a data packet, wherein the data packet corresponds to a data flow between the first network device and a second network device over a network;
identifying a first firewall policy associated with the first network device, the first firewall policy being provided by a controller and identifying a first firewall of the network configured to inspect the data packet;
inspecting, based at least in part on the first firewall policy and by the first firewall of the network, the data packet by the first network device;
adding, by the first network device, unified threat defense (UTD) metadata to a header of the data packet to indicate inspection by the first firewall;
transmitting, via the network, the data packet to the second network device at a second site;
identifying, based on receiving the data packet and by the second network device, a second firewall policy associated with the second network device, wherein the UTD metadata indicates a profile identifier applied to the data packet by the first firewall, wherein identifying the second firewall policy is based on extracting the profile identifier; and
determining, by the second network device, based at least in part on the second firewall policy and the UTD metadata, to refrain from inspecting the data packet.

9. The system of claim 8, wherein the data packet comprises an initial data packet of the data flow, the operations further comprising refraining from adding the UTD metadata to subsequent data packets of the data flow.

10. The system of claim 8, wherein refraining from inspecting the data packet comprises refraining from processing a Layer 7 Firewall inspection by the second network device.

11. The system of claim 8, wherein the first network device comprises a software defined cloud interconnect (SDCI) router and the second network device comprises a SDCI headend device.

12. The system of claim 8, wherein the header of the data packet comprises a software defined wide area network (SDWAN) header and the UTD metadata is added to the SDWAN header in a tag length value format.

13. The system of claim 8, wherein the UTD metadata comprises a flag that is included as part of a security level tag length value.

14. The system of claim 8, wherein the network comprises a software defined cloud interconnect wide area network and wherein data included in the header of the data packet is encrypted.

15. One or more non-transitory computer-readable media storing computer-readable instructions that, when executed by one or more processors, cause the one or more processors to perform operations comprising:

receiving, by a first network device located at a first site, a data packet, wherein the data packet corresponds to a data flow between the first network device and a second network device over a network;

identifying a first firewall policy associated with the first network device, the first firewall policy corresponding to a unified security policy and identifying a first firewall of the network configured to inspect the data packet;

inspecting, based at least in part on the first firewall policy and by the first firewall, the data packet by the first network device;

adding, by the first network device, a marker to the data packet to indicate inspection by the first firewall, the marker comprising unified threat defense (UTD) metadata;

transmitting, via the network, the data packet to the second network device at a second site;

identifying a second firewall policy associated with the second network device, the second firewall policy corresponding to the unified security policy, wherein the UTD metadata indicates a profile identifier applied to the data packet by the first firewall, wherein identifying the second firewall policy is based on extracting the profile identifier; and determining, by the second network device, based at least in part on the second firewall policy and the marker, to refrain from inspecting the data packet.

16. The one or more non-transitory computer-readable media of claim 15, wherein the marker further comprises a flag included in the UTD metadata in a header of the data packet, wherein the flag is included as part of a security level tag length value.

17. The one or more non-transitory computer-readable media of claim 15, wherein determining to refrain from inspecting the data packet comprises refraining from processing a Layer 7 Firewall inspection by the second network device.

18. The one or more non-transitory computer-readable media of claim 15, wherein the first firewall of the network comprises a zone-based firewall.

* * * * *